Dec. 29, 1953    O. V. PAYNE    2,664,183
ONE-WAY CLUTCH
Filed Aug. 22, 1951
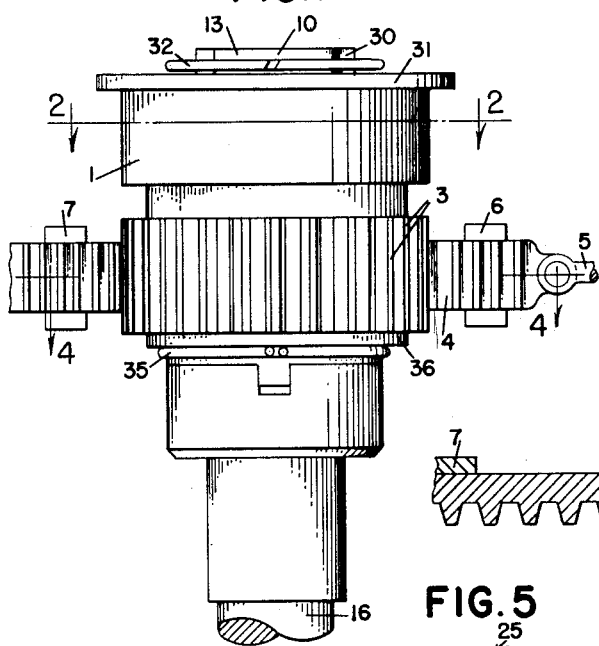
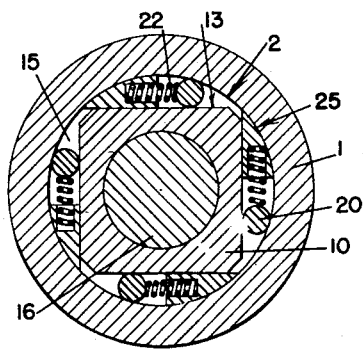
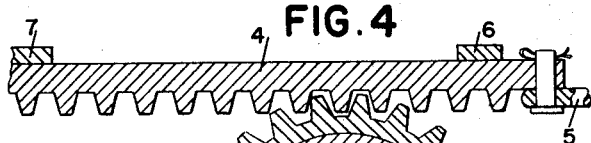
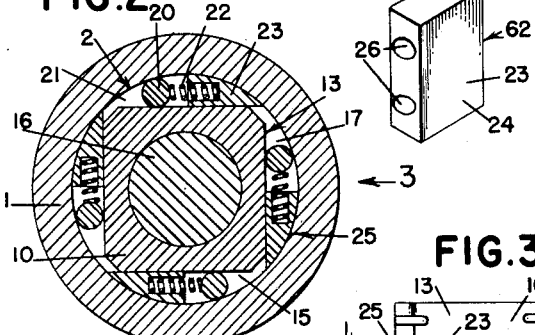
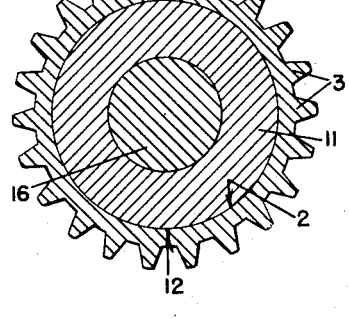
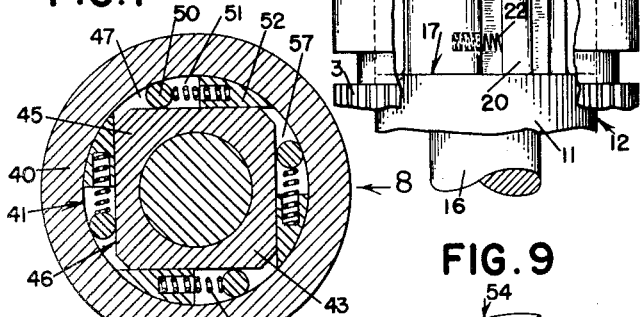
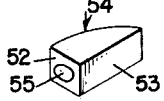
INVENTOR
OSCAR V. PAYNE
Charles T. Hawley
ATTORNEY Patented Dec. 29, 1953

2,664,183

UNITED STATES PATENT OFFICE 2,664,183

ONE-WAY CLUTCH

Oscar V. Payne, Leicester, Mass., assignor to Crompton & Knowles Loom Works, Worcester, Mass., a corporation of Massachusetts Application August 22, 1951, Serial No. 243,013

11 Claims. (Cl. 192—45)

This invention relates to improvements in clutches and it is a general object of the invention to provide a simple clutch which can be readily altered to effect a reversal of operation.

It is a further object of the invention to provide clutch members one within the other so shaped as to form a pocket to receive two elements both of which engage the members, one element transmitting a driving force from the driving to the driven element and the other element carrying a spring or the like to hold the first element in driving position but sliding relative to the driving member so that it cannot transmit force between the members.

It is a still further object of the invention to provide one of the aforesaid members with an internal cylindrical surface and the other member with a flat surface, these two surfaces forming a segmental pocket one end of which receives the spring carrier element which has arcuate and planar faces to fit the pocket. The arcuate and planar faces simultaneously engage the cylindrical and flat surfaces along substantial areas so that although the carrier element is acted on by the force of the spring it will nevertheless slide with respect to the cylindrical surface and not lock the two members together when the driving member has a reverse or idle return motion.

It is still another object of the invention to make the aforesaid segmental pocket and the elements in it in such manner that the elements can be interchanged when it is desired to reverse the direction of the driven member of the clutch.

In order that the invention may be clearly understood reference is made to the accompanying drawings which illustrate by way of example two embodiments of the invention and in which:

Fig. 1 is an elevation of the preferred from of clutch showing the force transmitting elements as rollers, Fig. 2 is a horizontal section on line 2—2, Fig. 1, showing the elements in position to effect counter-clockwise turning of the inner member, Fig. 3 is a side elevation looking in the direction of arrow 3, Fig. 2, parts being broken away, Fig. 4 is a horizontal section on line 4—4, Fig. 1, Fig. 5 is a perspective view of one of the spring carrier elements shown in Fig. 2, Fig. 6 is a view similar to Fig. 2 but showing the force transmitting and spring carrier elements interchanged so that the direction of turning of the inner driven member is reversed, Fig. 7 is a view similar to Fig. 3, but showing the modified form of the invention wherein the force transmitting elements are balls, Fig. 8 is a side elevation looking in the direction of arrow 8, Fig. 7, parts being broken away, and Fig. 9 shows a perspective view of spring carrier element used with the modified form of the invention.

The clutch to be more particularly described hereinafter has been found to operate satisfactorily with the letoff mechanism of a loom, but it is to be understood that the clutch is not limited to use in a loom nor necessarily to use with certain parts which are shown in the drawings as connected to the driving and driven members.

Referring particularly to Figs. 1 to 5, the outer clutch member 1 is made in the form of a shell as suggested in Fig. 2 and has an internal cylindrical surface 2. The lower part of the shell member 1 is provided with gear teeth 3 for cooperation with a rack 4 which may be reciprocated in any approved manner, as by a connector 5. The rack is slidable in guides 6 and 7 and as it reciprocates it causes oscillation of the outer clutch member, rocking the latter first in one direction and then in the opposite direction. The gear teeth and rack have been used in a loom to effect oscillation of member 1, but any other means may be employed for this purpose.

A second clutch member 10 is within the shell member and has the lower end thereof formed as a cylinder 11 the external surface 12 of which fits the lower part of internal surface 2 of the member 1. The upper part of the inner member is in the present instance formed with four flat surfaces 13. These surfaces are parallel to the axis of the cylindrical surfaces 2 and 12 and together with surface 2 form segmental pockets 15 as shown for instance in Fig. 2. The inner member 10 is connected to a shaft 16 which is attached to a part (not shown herein) to receive intermittent motion, such for instance as the worm shown in my prior Patent No. 2,062,725. The clutch member 10 is formed with horizontal shoulders 17 which extend outwardly from the bottoms of the surfaces 13 toward the surface 12.

Each pocket 15 has located therein a force transmitting element and a spring carrier element. Since the pockets and the parts in them are the same a detailed description will be given of but one of them, namely, the pocket at the top of Fig. 2.

The force transmitting element 20 in the preferred form of the invention is a roller circular in cross section and having an axis which is parallel to the axis of the cylindrical surface, this axis in effect being the axis of the clutch. The roller as viewed in Fig. 2 will be urged toward the adjacent or left hand corner or end 21 of the segmental pocket by one or more compression springs 22 which are held by a segmental carrier element 23. The carrier element has a flat or planar surface 24 adapted to fit along the corresponding surface 13 and has also an arcuate surface 25 having the same radius of curvature as the internal cylindrical surface 2. The carrier as shown in Fig. 5 is provided with two horizontal holes 26 into which the springs 22 are fitted sufficiently snugly to remain in place when applied to the carrier. The height of the carrier element may conveniently be substantially the same as that of the roller element, although this is not an essential relation, and the carrier may be made of any suitable material, rubber or acrylic or nylon resinous plastics having been used for this purpose.

Each roller 20 and its corresponding carrier will rest on the associated shoulder 17 and the springs 22 will exert a light pressure on the roller urging it toward one end of the segmental pocket and urging the carrier toward the other end of the pocket.

Assuming that the oscillating clutch member 1 is turning in a driving or counter-clockwise direction, Fig. 2, the roller will be locked between the internal cylindrical surface 2 and the adjacent flat surface 13 so that both members of the clutch will turn in a counter-clockwise direction. During this operation that part of the cylindrical surface which engages the roller turns in a direction toward the end or corner 21 of the pocket adjacent to the roller.

When the outer member 1 reverses its direction and has an idle return motion in a clockwise direction, Fig. 2, the roller 20 will be moved a slight distance out of locking or driving relation with respect to the members and the cylindrical surface 2 will slide along the arcuate surface 25 of the carrier element 23 but without causing turning of the inner member 10. The arcuate surface 25 is parti-cylindrical and may be considered as having a plurality of points arranged circumferentially of the surface 2 for engagement with the latter, the carrier thus having engagement with the cylindrical surface 2 over a considerable area or at a considerable number of points, whereas the roller has a line tangential engagement with the surfaces 2 and 13.

In operation it has been found that when a clutch of this type is applied for instance to the letoff mechanism of a loom rocking of member 1 in the driving direction will cause instant response on the part of the member 10 to turn shaft 16, but when member 1 rocks in the opposite direction the member 10 and shaft are not moved and the cylindrical surface 2 slides along the arcuate surface 25 without causing the latter to lock in its corner or end of the associated segmental pocket.

If it be desired to effect reversal of the direction of turning of the inner driven member the elements 20 and 23 can be interchanged as suggested in Fig. 6, in which case clockwise turning of the outer member 1 will cause turning of the inner member, but reverse turning of the outer member will cause the cylindrical surface 2 to slide along the arcuate surface 25 without turning the inner member 10.

As an instance of use for the reversible feature of the clutch mention may be made of those types of looms which have upper and lower warp beams which turn in opposite directions to feed warp toward the shedding mechanism. If letoffs are used for such beams employing clutches as set forth herein the elements 20 and 23 can be arranged as shown in Fig. 2 for the clutch of one of the beams and arranged as shown in Fig. 6 for the clutch of the other beam. The reversible feature of the clutch however is not limited to use in weaving machinery, and a loom having top and bottom warp beams is mentioned only by way of example.

Fig. 1 shows the upper part of the member 10 extending as at 30 to a distance above the top of the member 1 and shows also a disk or plate 31 extending over the member 1 to confine the elements 20 and 23 within the pockets. Also, a lock ring 32 above the disk may be detachably engaged with the upper extension 30 of the clutch member and serves normally to hold the disk against upward displacement. In similar manner, the lower part of the cylindrical bottom 11 of the driven clutch member 10 is engaged by a detachable lock ring 35 on which the bottom 36 of the member 1 rests. By means of the lock rings 32 and 35 the oscillating member 1 is confined lengthwise of the driven member 10.

In the modified form of the invention shown in Figs. 7 to 9 the outer driving clutch member 40 is similar to member 1 and has an internal cylindrical surface 41 similar to surface 2 and also has the gear teeth 42 for engagement with a rack which may be similar to rack 4. The inner driven clutch member 43 has the lower cylindrical part 44 thereof of somewhat greater height than the corresponding part of the preferred form and the upper square part 45 of the member 43 is shorter and has shortened flat surfaces 46 similar to surfaces 13. These surfaces 46 form segmental pockets 47 of less height than pockets 15 but otherwise similar to them.

In the modified form the force transmitting elements 50 are in the form of balls which have point contact with surfaces 41 and 46 and rest on shoulders 51 formed on the cylindrical part 44 of member 43. The segmental carrier elements 52 are of less height than carriers 23 but have planar surfaces 53 and arcuate surfaces 54 similar to surfaces 24 and 25, respectively. The carrier element has a single hole 55 to receive a spring 56 similar to spring 22. Each spring 56 urges its ball toward one end or corner 57 of the associated pocket 47 and urges the carrier 52 toward the opposite end or corner of the pocket.

It is believed that the operation of the modified form will be understood from the description already given of the operation of the preferred form and it will be apparent that the elements 50 and 52 can be interchanged when it is desired to reverse the direction of turning of the inner driven member 43 by the outer member 40.

The modified form of the clutch may have a disk 60 similar to disk 41 and a lock ring 61 similar to ring 42, see Fig. 8, and may otherwise be similar to the clutch of the preferred form.

As shown for instance in Figs. 2 and 7 the segmental elements are of a length somewhat less than half the total length of the segmental pocket and the force transmitter element 20 is located in the half of the pocket opposite to the segmental element. These relationships permit free operation of the elements within the pockets, each element being capable of slight motion in the direction of the length of the pocket. The resilient means shown are springs 22 and 51 which have direct engagement with the rollers 20 or balls 50, but the invention is not necessarily limited to a spring, and any resilient means performing substantially the same function as the spring can be utilized. Also, as shown for instance in Fig. 2 the planar and arcuate surfaces 24 and 25 respectively intersect along an edge 62 which engages the interior cylindrical surface as a convenient means for limiting motion of the spring carrier element, but in practice it has been found that this corner 62 is not essential although it is convenient to use.

From the foregoing it will be seen that the invention sets forth a simple form of clutch having an outer oscillating driving member provided with an inner cylindrical surface and an inner driven clutch member having flat surfaces parallel to the axis of the clutch and forming segmental pockets with the cylindrical interior surface, these pockets receiving force transmitting elements which have tangential engagement with surfaces of the members and being urged into normal engagement with the members by resilient means supported by carriers which are also located in the pockets. The elements within the pockets are interchangeable so as to effect reversal of the direction of drive of the inner driven member. During a driving operation the outer member and the force transmitting elements cooperate to turn the inner member, but on the reverse or idle motion of the driving member the transmitting elements are moved to non-driving position and the internal cylindrical surface slides along the arcuate surfaces of the spring carrying elements without exerting any appreciable turning force on the inner member.

Having now particularly described and ascertained the nature of the invention and in what manner the same is to be performed, what is claimed is:

1. In a clutch, a driving member oscillating about an axis and having an internal cylindrical surface concentric with the axis, a driven member within the driving member rotatable about said axis and having an external cylindrical surface concentric with said axis fitting part of said internal cylindrical surface and around which said driving member turns and having also a flat surface parallel to the axis and forming a segmental pocket with said internal cylindrical surface, a force transmitting element circular in cross section in the pocket between the internal cylindrical and flat surfaces and located nearer to one end of said pocket than to the other end thereof, a carrier element in said other end of the pocket separate from said members having a planar surface and an arcuate surface of the same curvature as that of said internal cylindrical surface, and resilient means supported by the carrier engaging the force transmitting element urging the latter toward said one end of the pocket and into driving engagement with said members and urging the carrier element toward the other end of said pocket with said flat and planar surfaces engaging each other and with the arcuate surface of the carrier element in engagement with said internal cylindrical surface, said driving member when turning in a direction to move the internal cylindrical surface toward said one end of said pocket cooperating with the force transmitting element to turn the driven member and said driving member when turning in the opposite direction causing said internal cylindrical surface to slide along said arcuate surface without causing said carrier element to turn said driven member and moving said force transmitting element out of driving relation with respect to said driven member.

2. In a clutch, a clutch member rotatable about an axis and having an internal cylindrical surface concentric with said axis, a second clutch member within said cylindrical surface rotatable about said axis and having an external cylindrical surface concentric with said axis fitting part of said internal cylindrical surface and around which said driving member turns and having also a flat surface parallel to said axis and forming with said internal cylindrical surface a segmental pocket having two corners, a force transmitting element of circular cross section in said pocket, resilient means urging said transmitting element toward one of said corners, and a segmental carrier element for said resilient means separate from said members located in the other corner of said pocket having a planar surface lying against the flat surface of said other clutch member and having a parti-cylindrical surface extending along and in contact with part of said internal cylindrical surface of the first clutch member, said resilient means normally maintaining the force transmitting element in driving engagement with said clutch members and holding said segmental carrier in said other corner of said segmental pocket against said members.

3. In a clutch, a clutch member rotatable about an axis and having an internal cylindrical surface concentric with said axis, a second clutch member within said cylindrical surface rotatable about said axis and having an external cylindrical surface concentric with said axis fitting part of said internal cylindrical surface and around which said driving member turns and having also a flat surface parallel to said axis and forming with said internal cylindrical surface a segmental pocket having two corners, a force transmitting element of circular cross section in said pocket, a segmental element in said pocket separate from said members having a planar side to engage the flat side of said second member and having a parti-cylindrical side of the same radius of curvature as that of said internal cylindrical surface, and resilient means intermediate said elements normally urging said transmitting element toward one of said corners in driving engagement with said members and also normally holding said segmental element in the other corner of said pocket with said flat and planar surfaces in engagement and with said parti-cylindrical side in engagement with said internal cylindrical surface.

4. The clutch set forth in claim 3 wherein the force transmitting element is a roller the axis of which is substantially parallel to said axis of the driving member and said resilient means includes a compression spring extending into said segmental element and engaging the roller.

5. The clutch set forth in claim 3 wherein the force transmitting element is a ball and said resilient means includes a compression spring extending into said segmental element and engaging the ball.

6. The clutch set forth in claim 3 wherein the first clutch member oscillates about said axis and said segmental element occupies less than half of said segmental pocket and the force transmitting element is within that half of the pocket opposite to said segmental element.

7. The clutch set forth in claim 3 wherein the first clutch member oscillates about said axis and said segmental and force transmitting elements are interchangeable with respect to said pockets so that depending upon toward which corner of the pocket the force transmitting element is urged by the resilient means the oscillating clutch member can effect turning of the other member in one or the other direction about said axis.

8. The clutch set forth in claim 3 wherein the segmental element has an end thereof formed by the intersection of the parti-cylindrical and planar surfaces thereof held in engagement with said internal cylindrical surface by said resilient means.

9. In a reversible clutch, a clutch member oscillatable about an axis and having an internal cylindrical surface concentric with said axis, a second clutch member within said cylindrical surface rotatable about said axis and having an external cylindrical surface concentric with said axis fitting part of said internal cylindrical surface and around which said driving member turns and having also a flat surface parallel to said axis and forming with said internal cylindrical surface a segmental pocket having two corners, a force transmitter element of circular cross section in said pocket capable of occupying two positions in said pocket in one position of which it is nearer one of said corners and in the other position of which it is nearer the other corner, a segmental element in said pocket separate from said members capable of fitting into either corner and having a planar side to fit said flat surface and having a parti-cylindrical side capable of fitting along said internal cylindrical surface, and resilient means intermediate said elements regardless of which corners are occupied by the elements capable of holding said segmental element in a corner of the pocket while urging the force transmitting element toward the other corner of the pocket and in driving engagement with said internal cylindrical and flat surfaces.

10. In a clutch, a clutch member movable angularly about an axis and having an internal cylindrical surface concentric with said axis, a second clutch member having an external cylindrical surface concentric with said axis within and fitting part of said internal cylindrical surface and around which said internal cylindrical surface turns, said second clutch member having a flat surface forming with the internal cylindrical surface a segmental pocket having two corners, a force transmitting element in said pocket having a circular cross section, a second element in said pocket separate from said members shaped to have a plurality of points thereof arranged circumferentially of and capable of simultaneously engaging said internal cylindrical surface, and resilient means intermediate said elements urging the force transmitting element toward one of said corners and in tangential engagement with said internal cylindrical and flat surfaces and holding said second element in the other corner of said pocket with said plurality of points thereof simultaneously in engagement with said internal cylindrical surface, one of said members when turning in a direction from the point of tangency thereof with the force transmitting element toward said one corner cooperating with said first element to turn the other member and said member when turning in the opposite direction causing relative sliding of said plurality of points of the second element with respect to said internal cylindrical surface without turning the other member.

11. The clutch set forth in claim 10 wherein said plurality of points are located on a surface of the second element which is maintained in surface contact with said internal cylindrical surface by said resilient means.

OSCAR V. PAYNE.

References Cited in the file of this patent

UNITED STATES PATENTS

| Number | Name | Date |
|--------|------|------|
| 691,548 | Johnson | Jan. 21, 1902 |
| 1,242,201 | Keller | Oct. 9, 1917 |
| 1,511,226 | Lawrence | Oct. 14, 1924 |